(No Model.)
J. MISHLER.
FODDER LOADER.
No. 391,979. Patented Oct. 30, 1888.
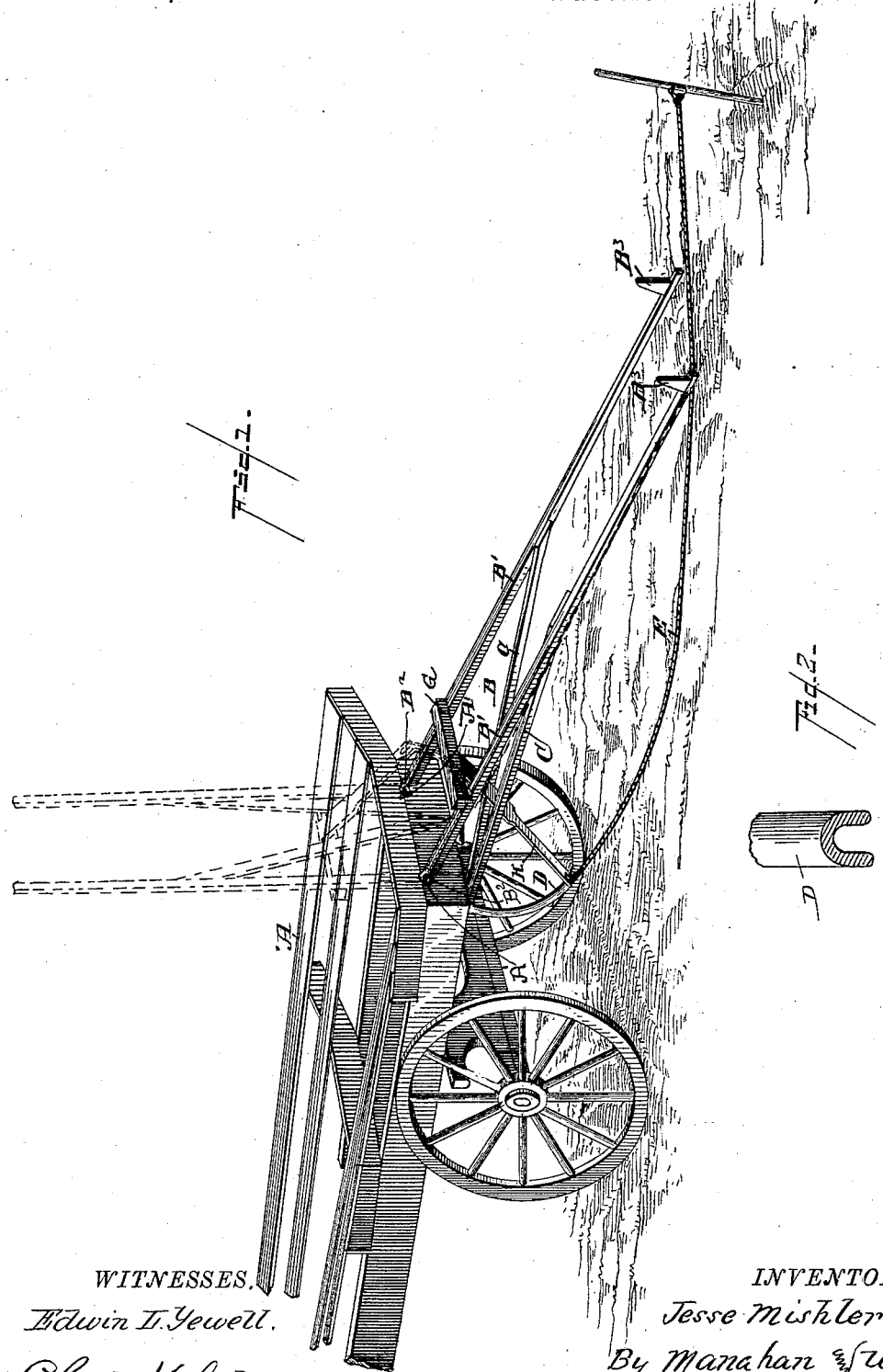
WITNESSES.
Edwin I. Yewell.
Chas. Helm.
INVENTOR.
Jesse Mishler.
By Manahan & Ward,
Attorneys.

UNITED STATES PATENT OFFICE.

JESSE MISHLER, OF STERLING, ILLINOIS.

FODDER-LOADER.

SPECIFICATION forming part of Letters Patent No. 391,979, dated October 30, 1888.

Application filed December 1, 1887. Serial No. 256,705. (No model.)

*To all whom it may concern:*

Be it known that I, JESSE MISHLER, a citizen of the United States, residing at Sterling, in the county of Whiteside and State of Illinois, have invented certain new and useful Improvements in Fodder - Loaders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to fodder-loaders, and pertains to certain mechanism attached to and operated conjointly with a wagon or other vehicle.

My invention is equally applicable to the loading of corn-fodder, grain-shocks, sheaves, hay, straw, brush, or other material; but its chief characteristic and value lie in the fact of it affording simple and effective means of rapidly loading corn-shocks or corn-fodder upon a vehicle.

My invention consists, mainly, of a frame suitably hinged at its forward end to the rear of the carrying-vehicle and adapted to rest at its rear portion alongside of the cornshock or hay-heap. By one movement the shock can be pushed over on its side on such outer and lower end of the frame, where it is held from sliding off from the end of the frame by suitable upwardly - projecting standards. Mechanism, one species of which is hereinafter described, is provided to cause the rear end of the hinged frame to swing upward and toward the vehicle when the latter is started. The frame turns upon its forward hinged connection with the wagon, and is thrown slightly beyond the vertical, by which operation the imposed fodder or other material is cast upon the wagon in position to be properly arranged or "built" thereon. The loading-frame may be made of any desired length, and be thus adapted to raise the material placed thereon to any desired height. In the case of loading hay from heaps, the frame may be placed alongside of said heap and the latter easily inverted over and upon the loader, and by the latter thrown or cast upon the wagon. The frame is lowered gradually by the attendant placing his foot on the rope E.

In the drawings, Figure 1 is a side elevation in perspective of a portion of a wagon with my invention attached thereto, the limit of the upward and inward throw of the frame being designated in dotted lines. Fig. 2 is a detail of the segmental bar D.

A is the usual rack, placed on an ordinary wagon, and of sufficient width to carry one or two lengths of cornstalks. At any suitable point in the rear end of the frame A are secured two horizontal staples or eyes, A', adapted to receive the vertical downwardly-engaging hooks B², attached to the front end of each of the carrying arms B' of the loading-frame B. This connection to the forward end of the frame of the wagon can be accomplished in any of the obvious modes, the object being merely to give said frame the hinged connection to the wagon, and one which can be readily disengaged. The arms B' extend any desired distance to the rear, and the free ends thereof are provided with upwardly-extending stakes B³, to prevent the material from slipping over the ends of the arms B'.

C C are braces suitably attached at their rear ends to the inner faces, respectively, of the arms B' and projected forward convergently and slightly below the plane of said arms. To the front and convergent ends of the braces C is attached a segmental bar, D, having a grooved exterior and extending slightly below and to the rear of the forward ends of the braces C. A rope or chain, E, is attached to the front end of the braces C and passed along the groove in the periphery of the segmental bar D, and extended a suitable distance to the rear of the outer ends of the lifting-arms B'.

When in position for loading, the rear ends of the arms B' rest upon the ground, as aforesaid, slightly beyond and alongside of the shock to be loaded, the rope E lying on the ground between, equally distant from, and parallel with the arms B'. After the shock has been pushed over onto the arms B' and lies horizontally across the same, an attendant holds the rear end of the rope E in any suitable way, preferably by means of a bar thrust through a loop in the rear end of said rope and projected slightly into the earth, or against some prominence thereon, (in case the ground be frozen,) and the operator holding against the forward draft of the rope E, the driver starts up his team, and, by reason of the forward end of the braces C being held through the medium of the rope E from movement forward with the wagon and the upward draft of the latter upon the hooks $B^2$, the rear ends of the lifting-arms B' are caused to rise, carrying with them the imposed fodder and casting the latter over and upon the rack A, whereon such fodder can be suitably placed by the driver.

I do not mean to limit myself to the precise forward attachment of the rope E shown and described, it being essential only that the forward attachment of the rope E to the frame B shall be below the plane of the attachment of the hooks $B^2$ aforesaid. The greatest tension upon the rope E is of course at the initiative of the forward movement of the rack A, and the provision of the segment D is to cause the draft of the rope E upon the forward end of the frame B to be as far as possible below the hinged connection of the latter at the initiative of said movement.

A short arm extending downward from the frame B, near its forward end, serves fairly well as a means of attachment to such frame of the forward end of the rope E.

A short cross-brace, G, connects the arms B' near the front end of the latter, and from said brace G an arm, H, extends downward, and is attached to the rear end of segmental bar D.

What I claim as my invention, and desire to secure by Letters Patent of the United States, is—

1. In combination with a transporting-vehicle, the frame B, hinged at its forward end to the rear of said vehicle and provided with side plates, B', and braces C, extended slightly below the plane of plates B', and the rope E, suitably attached to the projected end of braces C, and in the forward movement of said vehicle, and in conjunction therewith, adapted to elevate the outer end of said frame, substantially as shown, and for the purpose described.

2. In a fodder-loader, the combination of a transporting-vehicle, a lifting-frame, B, hinged at its forward end to the rear of said vehicle, and a rope, E, attached to said frame B below the hinged connection of the latter, and thus adapted to cause said frame to rise at its outer end upon the forward movement of said vehicle, substantially as shown, and for the purpose described.

In testimony whereof I affix my signature in presence of two witnesses.

JESSE MISHLER.

Witnesses:
DEWITT WEST,
JOHN G. MANAHAN.